No. 729,774. PATENTED JUNE 2, 1903.
J. R. KRALINGER & A. KLEIBER.
SEEDING MACHINE.
APPLICATION FILED APR. 2, 1903.
NO MODEL.
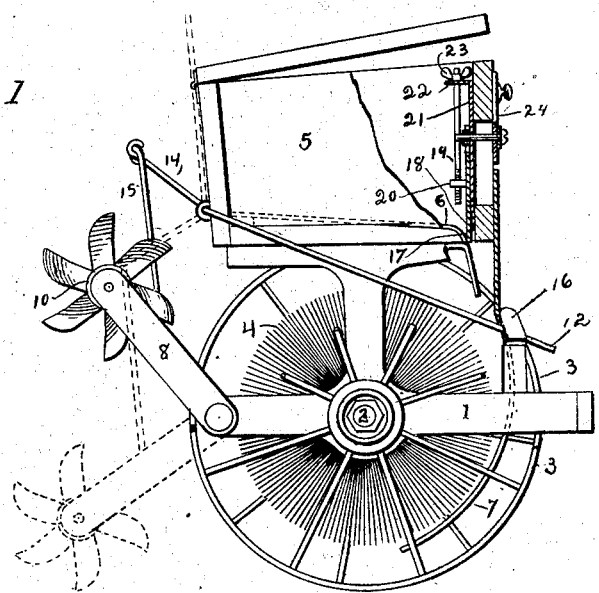
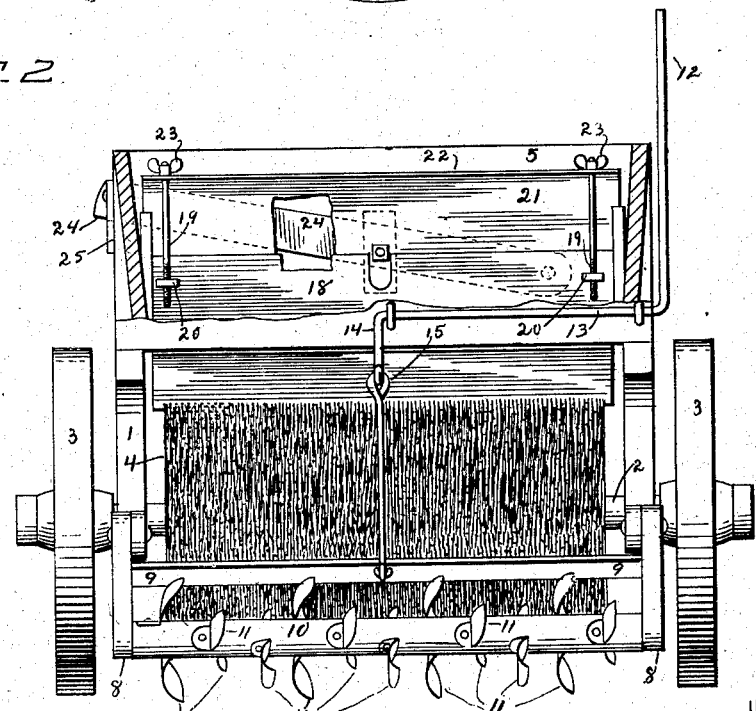
WITNESSES:
INVENTORS
Joseph R. Kralinger
Andrew Kleiber
BY J. W. Bond
ATTORNEY No. 729,774. Patented June 2, 1903.

UNITED STATES PATENT OFFICE.

JOSEPH R. KRALINGER AND ANDREW KLEIBER, OF CANTON, OHIO.

SEEDING-MACHINE.

SPECIFICATION forming part of Letters Patent No. 729,774, dated June 2, 1903.

Application filed April 2, 1903. Serial No. 150,819. (No model.)

*To all whom it may concern:*

Be it known that we, JOSEPH R. KRALINGER and ANDREW KLEIBER, citizens of the United States, residing at Canton, in the county of Stark and State of Ohio, have invented certain new and useful Improvements in Seeding-Machines; and we do hereby declare that the following is a full, clear, and exact description of the same, reference being had to the annexed drawings, making a part of this specification, and to the figures of reference marked thereon, in which—

Figure 1 is an end view showing parts broken away. Fig. 2 is a rear view showing parts broken away.

The present invention has relation to seeding-machines; and it consists in the novel arrangement hereinafter described, and particularly pointed out in the claims.

Similar numerals of reference indicate corresponding parts in all the figures of the drawings.

In the accompanying drawings, 1 represents the frame to which the axle 2 is properly journaled, and upon which axle are attached the traveling wheels 3. To the axle 2 is securely attached in any convenient and well-known manner the brush-head 4, which brush-head is formed of a length to correspond with the width of the strip of ground upon which seed is to be distributed.

To the frame 1 is securely attached in any convenient and well-known manner the seed-box 5, into which seedbox is to be placed the seed designed to be sown, and for the purpose of causing the seed to pass from the box its bottom 6 is inclined downward toward the forward side of the box.

In front of the brush-head 4 is located the curved plate 7, which curved plate is secured to the frame in any convenient and well-known manner, and the curvature of the plate 7 corresponds substantially with the outer periphery of the brush-head 4.

The object and purpose of providing the brush-head 4 is to provide a means for better distributing the seed after it has passed from the seedbox and during its travel from the seedbox to the ground. It will be understood that the brush-head will sweep the seed from the plate 7, thereby causing the greater part of the seed to drop from the lower edge of the plate 7.

To the rear portion of the frame 1 are pivoted the rearward-extending bars 8, which rearward-extending bars are held in proper relative position by means of the tie-bar 9, said tie-bar being securely attached to the bars 8 in any convenient and well-known manner. To the outer and free ends of the bars 8 is journaled the shaft 10, which shaft is provided with the seed-covering blades 11, which seed-covering blades are arranged substantially as shown in the drawings, and, as shown, they are curved or twisted, so that as they rotate they will agitate the ground in such a manner that the seed will be covered. It will of course be understood that when the covering-blades are to be brought into operative relation with reference to the ground the bars 8, together with the shaft 10 and its blades 11, are to assume the position illustrated in dotted lines, Fig. 1, and when the covering-plates are to be brought out of operative relation the parts are elevated by means of the lever 12, which lever is formed integral or fixed to the shaft 13, which shaft is provided with the right-angled portion 14, and to which right-angled portion is connected the link 15, which link is connected to the bar 9, and for the purpose of holding the above-named parts in an elevated position the catch 16 is provided, which catch holds the lever 12 down, as illustrated in Fig. 1.

It will be understood that in sowing different kinds of seeds the space 17 at the lower edge of the inclined bottom 6 should vary, and for this purpose the plate 18 is provided, which plate is held in fixed adjustment by means of the screws 19, which screws pass through the screw-threaded apertures formed in the lugs 20, which lugs are attached to the plate 18, and when it is desired to entirely cut off the flow of seed the plate 21, together with the plate 18, is brought down, so as to close the space 17.

The plate 21 is provided with the right-angled portion 22, which right-angled portion is for the purpose of holding the upper ends of the screws 19 by means of the thumb-nuts 23, so that as the plate 21 is moved upward it will carry the plate 18; but it will be understood that after the plate 18 is so adjusted that its bottom or lower edge comes below the edge of the inclined bottom 6 when the plate 21 is brought down to its lowest point the space will not be as great as it would be if the plate 18 would not come below the edge of the inclined bottom 6, so that provision can be made to regulate the space without making separate provision for each adjustment for the plate 21.

For the purpose of providing means for elevating the plate 18, together with the plate 21, the lever 24 is provided, which lever is moved up at its free end when it is desired to sow seed and brought down when it is desired to cut off the flow of seed. For the purpose of holding the lever 24 up a latch, such as 25, is provided, which latch is so arranged that it will catch the bottom or under side of the lever 24, but can be swung so as to permit the lever 24 to move downward and thereby close the space 17 and cut off the flow of seed.

Having fully described our invention, what we claim as new, and desire to secure by Letters Patent, is—

1. The combination of a frame, said frame provided with an axle having wheels secured thereto, a brush secured to the axle and rotatable therewith, a grain-plate located in front of the brush-head and curved to correspond substantially with the periphery of the brush, a seedbox provided with an inclined bottom, plates adjustably connected to the front side of the seedbox and the inner plate adjustable independent of the outer plate, substantially as and for the purpose specified.

2. The combination of a frame having journaled thereto an axle and the axle provided with wheels, and a brush-head, said brush-head rotatable with the axle, bars pivotally attached to the frame, a shaft journaled to the bars, said shaft provided with covering-blades, and means for holding the shaft and covering-blades in an elevated position, substantially as and for the purpose specified.

3. In a seeding-machine the combination of a frame having attached thereto a seedbox, means for regulating the flow of seed from the seedbox, bars pivotally attached to the frame, a shaft journaled to the bars and said shaft provided with curved covering-blades, and means for holding the shaft and covering-blade in an elevated position, substantially as and for the purpose specified.

In testimony that we claim the above we have hereunto subscribed our names in the presence of two witnesses.

JOSEPH R. KRALINGER.
ANDREW KLEIBER.

Witnesses:
J. A. JEFFERS,
F. W. BOND.